May 23, 1961 W. W. LETTS 2,985,206
MULTI-DISC ROTARY BREAKER AND SCRAPER

Filed April 25, 1960 2 Sheets-Sheet 1

INVENTOR.
WALTER W. LETTS
BY Kenwood Ross

ATTORNEY.

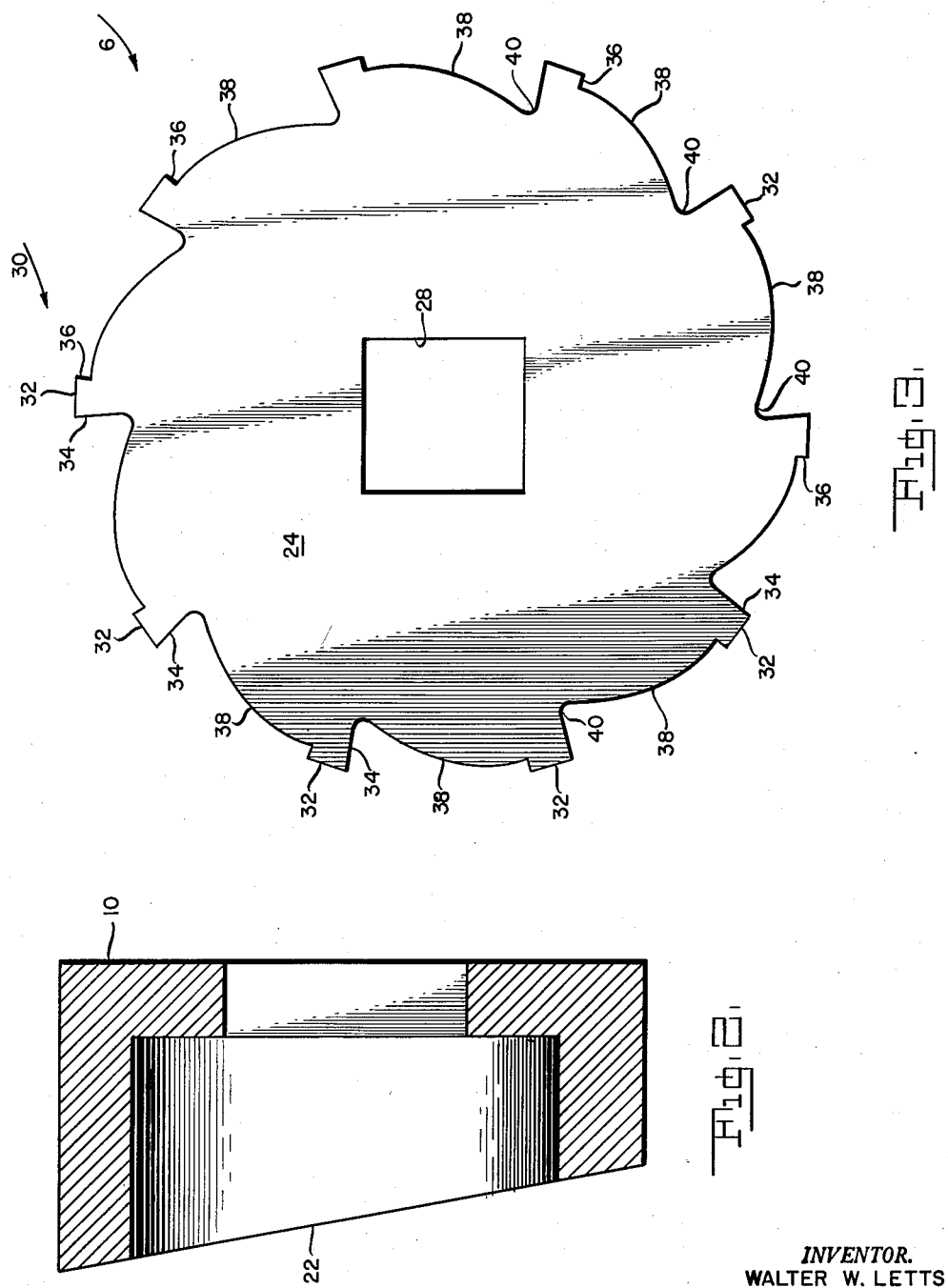

United States Patent Office 2,985,206
Patented May 23, 1961

2,985,206

MULTI-DISC ROTARY BREAKER AND SCRAPER

Walter W. Letts, 25 King St., Warrensburg, N.Y.

Filed Apr. 25, 1960, Ser. No. 24,366

2 Claims. (Cl. 144—208)

The present invention relates to new and useful improvements in structural refinements in barking heads and is directed more particularly to the provision of a barking head used in a multi-disc rotary cutter, the same having general utility in the arts, and to an improvement in the means for removing bark at a high rate of speed without damage to the clean wood.

A barking head is used in sawmills for the removal of bark from logs for the subsequent conversion of clean slabs into chips such as used in making paper.

Flail heads have been used on barking machines heretofore where the bark is removed by the hammer action of the chains hitting the log, but they have been high in their maintenance costs.

It is a principal object of the present invention to provide a barking head of the type described in which a multiplicity of barking discs are held in spaced parallel relationship on a head-shaft at an angle to the shaft so that, in one revolution thereof, each disc traverses a distance longitudinally of the log which is approximately ¼″ greater than the distance these discs are held apart, thus leaving a smooth, white surface on the log proper, and removing the bark therefrom in small particles so that the same may be immediately used for bedding or mulch.

It is a further object of my invention to provide cutting discs having shoes disposed radially on their outer peripheries, which shoes define an arc of a true circle struck from the axis of the respective cutting disc and serve to prevent the cutting points of the disc from dropping any deeper than the starting cut, it being desired to remove the bark from the log but to prevent more than a minimum amount of damage to the clean wood.

Another feature resides in the provision of a tool which may be raised and lowered with facility to suit the contour of the loop to be debarked.

Herein, a plurality of discs are angularized in spaced relationship relative to a shaft so as to provide a scraping effect by means of the shoes upon the discs, which shoes follow their respective breaker points in a true circle in a manner so that, in a single revolution of a disc, the breaking and scraping actions on the log proceed therealong for a distance equal to the space separating the said disc and its next adjacent disc. The said breaking and scraping actions remove the bark from the log and break the same into fine dustlike particles to provide a by-product useful as a mulch of improved qualities over the sawdust and/or shavings of conventional compositions.

Another object of the invention is to provide a barking tool in which each of the cutting discs may be of essentially identical configuration and thus may be replaced readily when dull or damaged.

Still another object is to provide a barking tool of the type described which will permit sharpening or resharpening of the discs in plurality and in position on the barking tool.

Another object hereof is to provide a barking head with discs having cutting teeth disposed more or less as a multiple helix and to provide for the mounting of the discs in more or less nested relationship with adjacent discs being similarly formed to provide for the cleaning of the bark from a continuous surface throughout the extent of the axial length of the nested discs upon an arbor or mandrel.

A salient feature of my invention resides in the fact that the log to be debarked may be moved longitudinally either to the right or to the left, all without impairing the efficiency of the tool.

The existing practice in the trade, as exemplified by the prior art, employs flail heads which are expensive to maintain and entails the use of a multitude of chains, bolts, nuts and bumper irons, with the bark being removed by the hammer action of the chains hitting the log.

In contradistinction, I have devised a novel means whereby these difficulties and objections are overcome. I accomplish this by the provision of a device which obviates the use of chains and which is simple to maintain and operate.

Other of the chief objects and purposes hereof are to provide advantageous structural and operational features in a device of the class to which reference has been made so as to provide an apparatus having the following meritorious characteristics: first, a simplicity in construction and therefore an adaptability to economical manufacture; second, a uniqueness in engineering design of coacting parts wherefor the components are coordinated for facile assembly and when once assembled are positively and securely retained in operative relationship, third, an ease of installation; fourth, a high degree of efficiency and dependability in its operational use; fifth, the securement of a higher degree of accuracy and greater degree of variety in the manner of work performed therewith than has heretofore been possible with prior devices known in the art; sixth, the attainment of a flexibility or a capability of adjustment by which a large variety of work can be produced by means of the same device; seventh, the achievement of a greater ease in repairs and consequent reduction in maintenance costs than has been possible in related devices heretofore known; eighth, the provision of a construction which may be readily installed with respect to the various purposes for which it is intended, and nine, the provision of such other improvements in and relating to barking heads of the type above referred to as are hereinafter described and claimed.

Further objects and advantages of the invention will be apparent from the following description taken in conjunction with the drawings, wherein:

Fig. 2 is an enlarged sectional view of the collar means of the invention; and

Fig. 3 is an enlarged front elevational view of one of the cutting disc means of the structure shown in Fig. 1.

Figure 1:
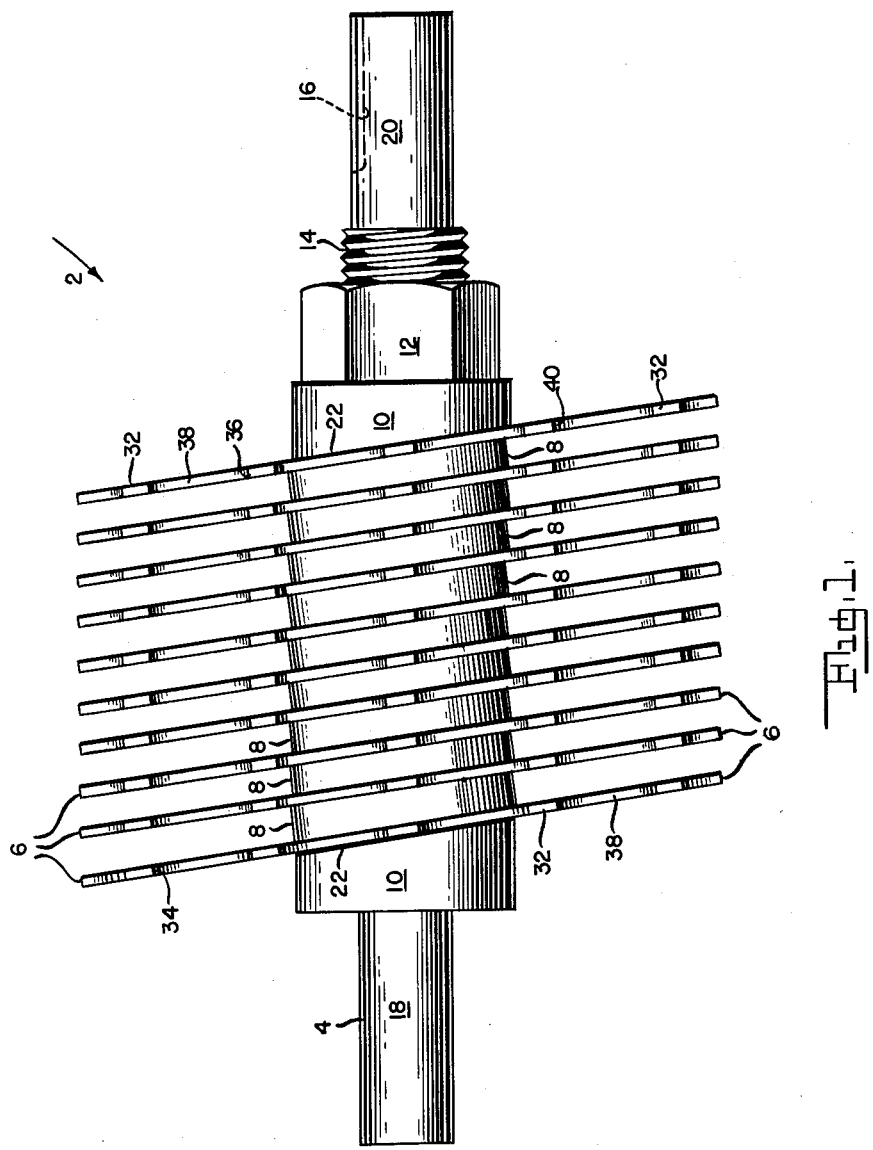
Fig. 1 is a top plan view of my invention.

With continued reference now to the drawings, wherein like characters of reference designate like parts throughout the several views, I have shown in Fig. 1 a debarking tool generally designated by the numeral 2 and including a shaft 4, having a plurality of cutting discs 6 held in spaced relationship by means of a plurality of spacers 8 journalled on the shaft and being restrained from longitudinal movement relative thereto by means of a pair of collars 10 also journalled on said shaft 4 as shown.

A lock nut 12 is engageable with threads 14 of the shaft 2 whereby said discs, spacers and collars may be secured in position relative to said shaft.

A key-way 16 is preferentially provided in one extremity 20 of the shaft 4 whereby the same may be mounted securely to a suitable means for revolving the tool.

It will be understood of course that the unit may be raised and lowered at will relative to a log being operated upon to suit the contour of the log.

Too, it will be understood that the log being debarked may be rotated by any suitable means and may also be moved longitudinally in either direction by other suitable means.

The shaft 4 has opposite extremities 18 and 20 which may be circular in cross section while its central portion (not shown) may be generally square in cross section.

Each of the discs, spacers and collars is provided with a suitable aperture of square configuration cut therethrough centrally therein whereby the same may be suitably journalled on the central portion of the shaft 4.

As illustrated in Fig. 1, when the discs 6 are mounted on the shaft 4, they are inclined at an angle relative to the longitudinal axis of the shaft.

The spacers 8 serve to maintain the cutting discs in spaced apart position when the tool is in operation.

It will be observed in Fig. 2 that each of collars 10 has an inner face 22 which is inclined correspondingly to the angle of inclination of the discs with said inner face embracing the adjacent face of one of the endmost discs of the tool.

One of the cutting members 6 is shown in Fig. 3 and may be seen to comprise a body blank 24 of generally disc shape provided with a square aperture 28 centrally thereof.

That is, the cutting member comprises a formed metal member of disc shape having a body portion provided with a central opening therein, the body portion extending generally radially with respect to the axis of the disc.

A plurality of teeth are radially disposed about the outer periphery of the disc 6, with each of said teeth being comprised of a scraper shoe 32 which defines the true arc of a circle.

Breaker points 34 are provided at the forward edges of each of said teeth, which breaker points act as the cutting members for entry of the disc into the bark of a log.

The shoes 32 prevent the cutter or breaker point 34 from dropping any deeper than its starting cut.

The depth of the cut made is gauged by the distance between adjacent shoes, with each of the shoes acting as a scraper which scrapings the next shoe throws off and leaves the same scraping effect for the following or succeeding shoe.

The true circle rearwardly of the breaker point acts as a shoe to prevent the breaker from penetrating any deeper than its original entry into the bark. Being hung on the shaft or mandrel at an angle, it additionally acts as a scraper as it is rotated so that in a single complete revolution a disc serves not only to break but also to scrape the bark along a certain distance longitudinally of the log, thus serving to remove the bark at a rapid rate and leaving a smooth surface on the log.

As shown in Fig. 3, each of the teeth projects outwardly from the plane of the body portion of the disc 6 and is of the same pitch and hand and sweep in essentially the same path. Each tooth has a trailing edge 36 which is offset from said body portion.

The area 38 between each of the teeth is recessed from the outer periphery of the disc, and curves gently downwardly from the trailing edge 36 to form a pocket 40 which curves upwardly to meet the cutting edge 34 of the next adjacent tooth.

It will be plainly evident that the use of my novel barking head will result in much more rapid debarking and scraping than can be obtained with any of the tools presently in existence.

As each of the discs is entirely separate and distinct, they may be readily removed from the shaft for sharpening and setting. Being spaced one from the other, they will not clog during operation of the tool.

It should be noted that my novel debarking head is simple in its construction and may be assembled and disassembled for repairs and the like with great facility.

Since the discs of the tool rotate at speeds between 1200 and 1600 r.p.m., work time and labor costs are substantially reduced.

It will be apparent to those skilled in the art that various changes may be made in the invention, all without departing from the spirit and scope thereof, and therefore, the invention is not limited by that which is shown in the drawings and described in the specification, but only as indicated in the appended claims.

Having thus described my invention what I claim is:

1. A cutter comprising a body blank of generally disc shape and being provided with an aperture centrally thereof, said body blank having a plurality of teeth radially disposed about the outer periphery thereof, each of said teeth being provided with a scraper shoe defining the true arc of a circle, each of said shoes having a leading edge forming a breaker point extending inwardly therefrom to said body blank and having a trailing edge extending inwardly therefrom to said body blank to meet said leading edge of the next of said shoes.

2. An apparatus for debarking logs comprising, a driven shaft, a plurality of circular plane cutting discs mounted on said shaft, each of said cutting discs having a plurality of teeth radially disposed about the outer periphery thereof, each of said teeth being provided with a scraper shoe which defines the true arc of a circle, each of said shoes having a leading edge forming a breaker point extending inwardly into said cutting disc and a trailing edge communicating with the leading edge of the next of said shoes of said cutting discs, a plurality of spacers mounted on said shaft between adjacent discs, the discs being mounted on the shafts at angles relative to the longitudinal axis of the shaft and in parallelism with each other.

References Cited in the file of this patent

UNITED STATES PATENTS

| | | |
|---|---|---|
| 179,401 | Coogan | July 4, 1876 |
| 228,041 | Cowan | May 25, 1880 |
| 327,203 | Smith | Sept. 29, 1885 |
| 346,681 | Perry | Aug. 3, 1886 |
| 972,446 | Hall | Oct. 11, 1910 |
| 1,691,850 | Krasnosky | Nov. 13, 1928 |
| 1,820,445 | Craft | Aug. 25, 1931 |
| 2,174,782 | Erickson | Oct. 3, 1939 |
| 2,490,165 | Shaw | Dec. 6, 1949 |
| 2,753,901 | Stauffer | July 10, 1956 |